United States Patent [19]
Munjat et al.

[11] 3,869,342
[45] Mar. 4, 1975

[54] CATIONIC THERMOSETTING RESIN COMPOSITION FOR IMPROVING WET STRENGTH OF PAPER

[75] Inventors: Francis S. Munjat, Philadelphia; Samuel Ho Kim, Haverford, both of Pa.

[73] Assignee: E. F. Houghton and Company, Philadelphia, Pa.

[22] Filed: June 7, 1973

[21] Appl. No.: 367,801

[52] U.S. Cl............................ 162/164, 260/857 TW
[51] Int. Cl........................... D21h 3/58, C08g 41/04
[58] Field of Search ...... 162/164, 168; 260/857 TW, 260/857 R, 785 C, 785 A, 785 L, 785 TF

[56] References Cited
UNITED STATES PATENTS

| | | | |
|---|---|---|---|
| 3,250,664 | 5/1966 | Conte et al. | 162/164 |
| 3,320,215 | 5/1967 | Conte et al. | 162/168 |
| 3,395,130 | 7/1968 | McDowell et al. | 260/785 C |
| 3,761,350 | 9/1973 | Munjat et al. | 162/164 |

*Primary Examiner*—S. Leon Bashore
*Assistant Examiner*—William F. Smith
*Attorney, Agent, or Firm*—Howson and Howson

[57] ABSTRACT

Cationic thermosetting resin compositions useful in imparting wet and dry strength to paper are formed of a mixture of (1) a primary water-soluble polyamine polyamide polymer A, prepared by reacting (a) a heterocyclic dicarboxylic acid of the formula:

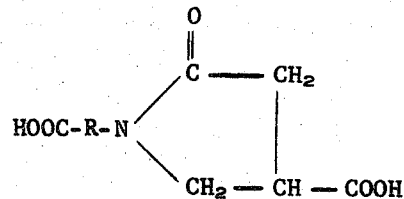

where R is alkylene or arylene with (b) an amino carbonyl compound, (c) a diamine or polyalkylene polyamine, and (d) itaconic acid, and (2) one or both of two secondary polyamine polyamide polymers B and C, the former being prepared by reacting reactants (b) and (c), above, and (e) epichlorohydrin, and the latter secondary polymer C being prepared by reacting reactants (a), (b), (c) and (e), above. The mixture of polymers is rendered thermosetting by further reaction with additional epichlorohydrin.

A considerable number of resins for imparting wet strength to paper have been developed in recent years. Most of these resins are of the thermosetting type, thermosetting properties generally having been provided by means of crosslinking agents such as halohydrins.

10 Claims, No Drawings

CATIONIC THERMOSETTING RESIN COMPOSITION FOR IMPROVING WET STRENGTH OF PAPER

In our co-pending application Ser. No. 367,802, filed on even date herewith, there are described and claimed certain cationic thermosetting resins which provide paper with outstanding wet strength, both off the machine and cured. In addition, such resins provide paper with improved dry strength. Other advantages of such resins are reduction in foaming in the paper machine and production of tissue of improved softness. Unfortunately, the resins of co-pending application Ser. No. 367,802 are somewhat expensive to prepare.

It has now been discovered that is is possible to dilute the thermosetting resins of the aforementioned application Ser. No. 367,802 with certain other cationic thermosetting resins which, although they do not provide paper with the same degree of wet strength as those of said application; nevertheless, are less expensive to prepare, and thereby obtain compositions which when applied to paper provide the paper with wet strengths similar to, and in some cases better than, those obtainable by use of the more expensive resins of application Ser. No. 367,802.

It is, therefore, an object of the present invention to provide novel cationic thermosetting resin compositions for providing paper with adequate wet strength yet are less expensive to prepare than many resins which provide similar wet strengths.

Another object of this invention is to provide resin compositions which undergo accelerated natural aging when incorporated in paper, thereby giving a more rapid increase in dry strength and wet strength.

A further object of the invention is the provision of cationic thermosetting resin compositions which reduce foaming on the paper machine.

A still further object of the invention is to provide resin compositions which increase softness in tissues while at the same time improve both wet and dry strength.

These and other objects of this invention will become apparent from a consideration of this specification and appended claims.

The cationic thermosetting resin compositions of this invention comprise a mixture of a primary polyamine polyamide polymer A, and a secondary polyamine polyamide polymer B or C or combination of such secondary polymers, said mixtures of polymers rendered thermosetting by epichlorohydrin. Primary polymer A may be prepared by reacting:

a. a heterocyclic dicarboxylic acid of the formula:

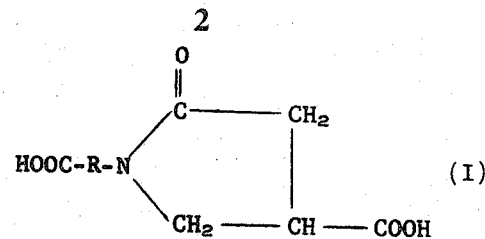

where R is an alkylene radical containing from 1 to 10 carbon atoms or an arylene radical, and for each mol of dicarboxylic acid, b. from 0 to 4 mols of an amino carbonyl compound which is an amino acid of the formula:

$$H_2N-R'-COOH \quad (II)$$

or a lactam of the formula:

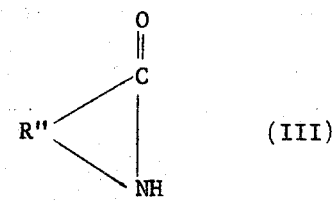

where $R'$ is an alkylene radical containing from 1 to 10 carbon atoms or an atom;

c. from 1 to 3 mols of an amine which is a diamine of the formula:

$H_2N-$ is an alkylene radical containging from 3 to 10 carbon atoms;

c. from 1 to 3 mols of an amine which is a diamine of the formula:

$$H_2N-R'''-NH_2 \quad (IV)$$

or a polyalkylene polyamine of the formula:

$$H_2N-(R^{iv}-NH)_n-H \quad (V)$$

where $R'''$ and $R^{iv}$ are alkylene groups containing from 2 to 6 carbon atoms, and $n$ is an integer from 1 to 5; and d. from 1 to 2 mols of itaconic acid to form a water soluble polyamine polyamide polymer of the following repeating structure:

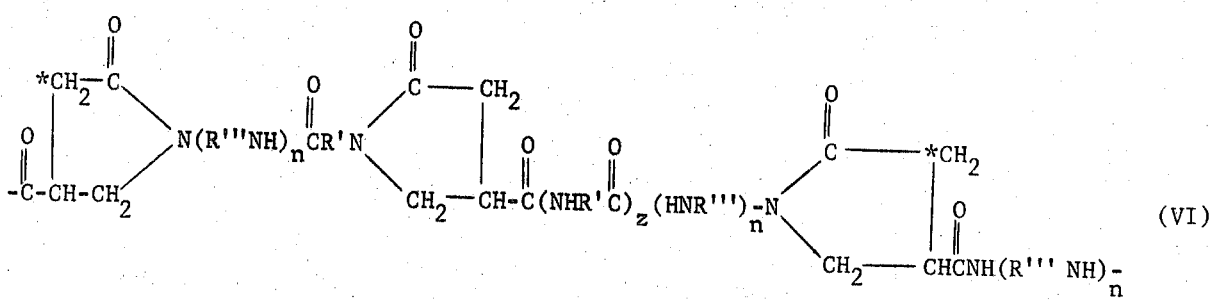

Z is 0 to 4, and R, R', R'', R''', R'''' and n are as defined above.

The additional pyrrolidone groups (asterisks) are generated simply by providing an excess of itaconic acid to amine and holding the reaction temperature low to allow the addition to the double bond to take place followed by cyclization as described in detail in co-pending application Ser. No. 367,802. Cylization can be observed by two mols of water of condensation being rapidly generated below 150°C., signifying a course other than amide formation in which water is generated only at temperatures above 150°C.

The unsymmetrical heterocyclic dicarboxylic acid reactant (a) may be prepared by reacting itaconic acid with an amino acid of formula (II) or a lactam of formula (III) in substantially equimolar proportions as described in co-pending application Ser. No. 367,802. The reaction may be carried out in aqueous solution; however, the amount of water used should be adjusted to provide suitable reaction conditions to produce the product desired. Thus, although the aqueous solution of reactant may contain up to about 50 % by weight of water, subsequent concentration by distillation may reduce the reaction solution to 5 to 10% of water. The reactants are merely mixed with water in the stated proportions, solubilized by heating to 105° to about 130°C. for a period of from about 2 to 5 hours. In the case of the amino acids, concentration of the reacting solution can begin immediately after solubilization; with lactams, sufficient time must be given to accomplish hydrolysis to amino acid. Initially, there is formed an intermediate tricarboxylic acid by addition of the itaconic acid methylene double bond to the amino group of the amino acid. The solution then only needs to be concentrated to form the heterocyclic dicarboxylic acid.

The reaction mechanism involved in forming one of the preferred heterocyclic dicarboxylic acids, namely, 1-(p-carboxyphenyl)-4-carboxypyrrolidone, may be illustrated by the following equations wherein itaconic acid and p-amino-benzoic acid are the reactants. The dicarboxylic acid separates from the reaction media and is isolated as a crystalline material.

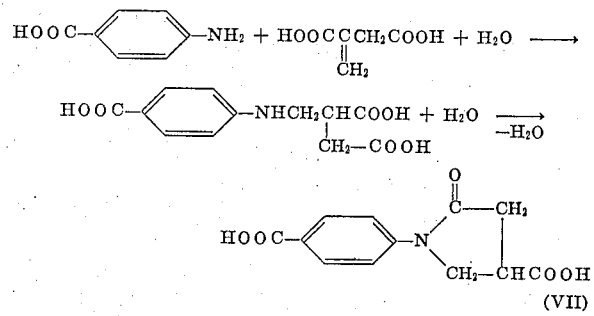

This heterocyclic dicarboxylic acid is identified by melting point (277°–287°C.), acid number (435), and an analysis of significant bands in an infrared spectrum.

This same reaction procedure utilizing aliphatic amino acids results in highly viscous solutions of the dicarboxylic acid at room temperature.

The same amino carbonyl compounds employed in forming the heterocyclic dicarboxylic acid may also be used in forming the water soluble polyamine polyamide polymer. However, in any particular polymer, the same or a different amino carbonyl compound may be used in forming the polymer as was employed in forming the heterocyclic acid.

As noted, the amino acids which may be used have the formula:

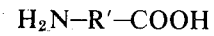

$$H_2N-R'-COOH \quad \text{(II)}$$

where R' is an alkylene radical containing from 1 to 10 carbon atoms or an arylene radical. The alkylene radical may be a straight or branched chain aliphatic group. Preferably, where R' is an alkylene radical, the amino acids are alpha-substituted amino acids such as alanine, leucine, valine, and alpha-amino butyric acid. Other suitable amino acids include glycine, beta-alanine, 4-amino butyric acid, 6-amino-caproic acid, and 11-amino undecanoic acid.

Aromatic amino acids which have been found useful in preparing the novel cationic thermosetting resins of the invention may contain such radicals as phenylene, naphthylene, etc., and alkyl substituted forms thereof. The amino group may be directly substituted on the aromatic nucleus, or it may be on a terminal carbon atom of an alkyl group of 1 to 7 carbon atoms substituted on the aromatic ring. Similarly, the carboxylic acid group may be directly substituted on the aromatic ring or on a terminal carbon atom of an alkyl group containing from 1 to 7 carbon atoms substituted on the aromatic ring. Water solubility of the final resin characterizes the useful amino and carboxyl group containing compounds. Typical of useful aromatic amino carboxylic acids are o, m, and p-amino benzoic acid, p-(2-aminoethyl) benzoic acid and p-aminophenylacetic acid.

Lactams which are suitable for use in preparing the resins of this invention have the formula:

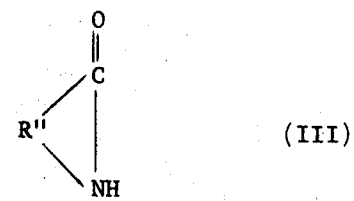

(III)

where R'' is an alkylene radical containing from 3 to 10 carbon atoms. Thus, useful lactams include pyrrolidone, e-caprolactam and the like, the latter lactam being particularly preferred.

In addition to the heterocyclic dicarboxylic acid and amino carbonyl compound, certain amines are also employed in combination therewith in preparing the water soluble polyamine polyamide polymers. As stated above, the amines may be certain alkylene diamines of formula (IV) or certain polyalkylene polyamines of formula (V).

In the diamines, the primary amine groups are separated by an alkylene radical containing from 2 to 6 carbon atoms. Thus, suitable diamines include ethylene, propylene, butylene, pentylene, and hexylene diamine. Ethylene and propylene diamine are particularly preferred diamines inasmuch as they are somewhat more economical than the higher diamines.

A variety of polyalkylene polyamines including polyethylene polyamines, polypropylene polyamines, polybutylene polyamines, and the like can be employed to produce the polyamide, of which the polyethylene polyamines represent an economically preferred class. More specifically, the polyalkylene polyamines employed are polyamines containing two primary amine groups, and at least one secondary amine group in which the nitrogen atoms are linked together by alkylene groups containing from 2 to 6 carbon atoms. The nitrogen atoms may be attached to adjacent carbon atoms in the ethylene groups or to carbon atoms further apart, but not to the same carbon atom. Polyamines such as diethylenetriamine, triethylenetetramine, tetraethylenepentamine, dipropylenetriamine, and the like, which can be obtained in reasonably pure form can be used as well as mixtures thereof and mixtures of various crude polyamine materials. For example, the mixture of polyethylene polyamines obtained by the reaction of ammonia and ethylenedichlorides, refined only to the extent of removal of chlorides, water, and excess ammonia, can be employed in the reaction with the dicarboxylic acid.

More preferred are the polyethylene polyamines containing from two to four ethylene groups, two primary amine groups, and from one to three secondary amine groups.

The term "polyalkylene polyamine," employed in this specification and the claims, therefore, refers to and includes any of the polyalkylene polyamines referred to above and to mixtures thereof.

Rather than using solely a diamine or a polyalkylene polyamine, mixtures of the two types of amines, e.g., a mixture of ethylenediamine and diethylenetriamine may also be used.

A preferred process by which the water soluble polyamine polyamide polymer A may be prepared is by reacting the heterocyclicdicarboxylic acid (I) with the diamine (IV) or polyalkylene polyamine (V) in the presence or absence of amino carbonyl compound (II) or (III) and heating this mixture at 150° to 165°C. for 60 to 90 minutes. During such heating, the components react to form short chain amide compounds of formula (VIII), below, and water of condensation which is utilized in the next step:

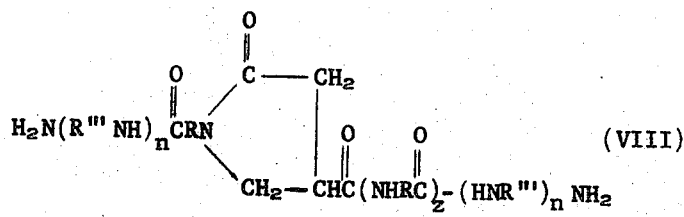

In formula (VIII) R,R''', $n$ and $z$ are as set forth above.

The intermediate reaction product with water added is cooled, and an excess of itaconic acid is added with respect to carboxyl group to amine to obtain a further intermediate of the formula:

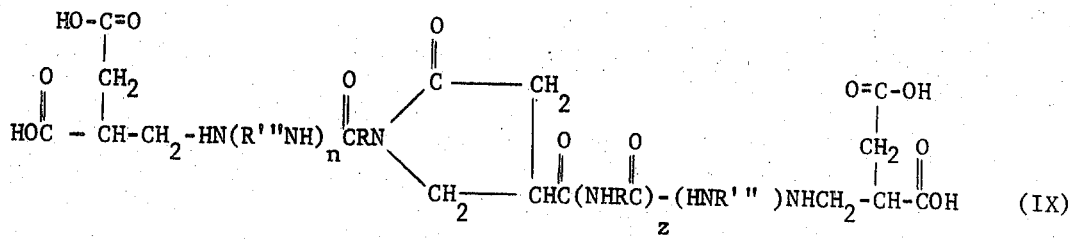

and the whole is refluxed at a temperature of from about 110°C. to 140°C., preferably 120° to 136°C., for 60 to 90 minutes to form the additional pyrrolidone groups in the chain. In the case of larger polyalkylene polyamines (V) where n equals 3 or more, the reaction product is added to the itaconic acid, and conversion to the pyrrolidone acid ceases when the amine content is equivalent to the carboxylic acid content, and is only about 50 % when $n$ is equal to 4. This further intermediate has the formula:

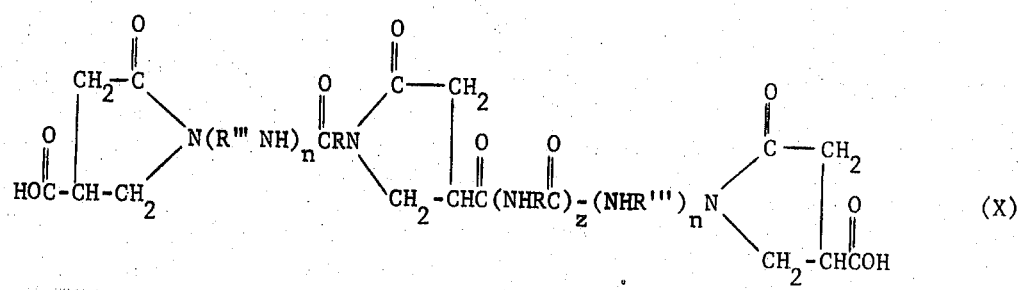

This intermediate product is further reacted with diamine (IV) or polyalkylene polyamine (V) to give a water soluble polyamine polyamide polymer. Condensation is effected by raising the temperature to 185°C. Those mols of water associated with the formation of the pyrrolidone ring are removed from the reaction site below 150°C. Water associated with polyamide formation is removed above this temperature. The final primary polymer A has the formula:

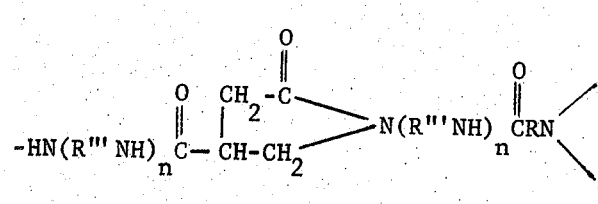

This polymer is diluted to 50% solids content with water.

A preferred polyamine polyamide polymer A is obtained by reacting 1- carboxypentyl- 4-carboxypyrrolidone, caprolactam, diethylene triamine, and itaconic acid.

The proportions of the reactants described above in providing the improved resins is quite important. It was found that the mol ratios of reactants: (a) heterocyclic dicarboxylic acid, (b) amino carbonyl compound, (c) diamine or polyalkylene polyamine, and (d) itaconic acid employed in providing the water soluble polyamine polyamide polymer should be:

(b) to (a) — from about 0:1 to about 4:1
(c) to (a) — from about 1:1 to about 3:1
(d) to (a) — from about 1:1 to about 2:1

Preferred mol ratios of the four reactants in obtaining resins of optimum wet strength (uncured and after cure) are (b) to (a) about 1:1, (c) to (a) about 3:1 and (d) to (a) about 2:1.

Polyamine polyamide polymer B may be prepared by reacting:

b. from 1 to 5 mols of an amino carbonyl compound which is an amino acid of the formula:

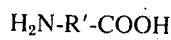

or a lactam of the formula:

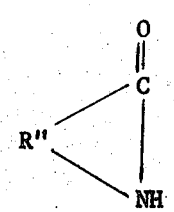

where R' is an alkylene radical containing from 1 to 10 carbon atoms or an arylene radical and R'' is an alkylene radical containing from 3 to 10 carbon atoms;

c. from 1 to 4 mols of an amine which is a diamine of the formula:

or a polyalkylene polyamine of the formula:

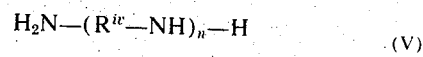

where R''' and R$^{iv}$ are alkylene groups containing from 2 to 6 carbon atoms, and n is an integer from 1 to 5; and e. from 1 to 3 mols of epichlorohydrin to form a water soluble polyamine polyamide polymer of the following structure:

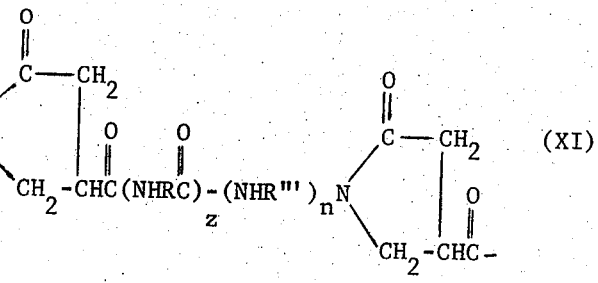

where x can be 1 to 3 and y can be 1 to 5.

A preferred process, by which the water soluble polyhydroxy polyamide polyamine polymer B may be prepared from the above-defined reactants, comprises mixing together in a suitable reactor the amino carbonyl compound (II) or (III) and the amine (IV) or (V) and one mol of water, and heating the mixture for 2 to 3 hours at reflux (105°C.). This gives an intermediate of formula:

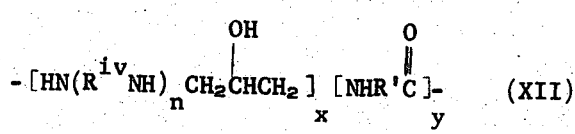

The reaction intermediate is cooled, and epichlorohydrin, reactant (e), is added incrementally controlling the temperature rise. This forms a further intermediate of formula:

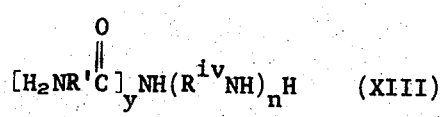

After the addition of the epichlorohydrin, the reaction product is heated to a temperature from about 160° to 185°C., to complete the reaction cycle, and give a polymer of formula:

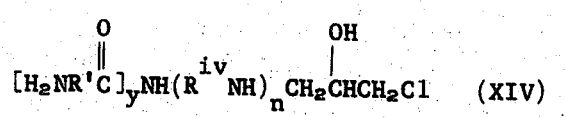

Vacuum is applied for at least one half hour at the end of the reaction. This polymer B is diluted with water to give from about 35% to 50% solids content.

In this reaction secondary amines are produced from primary amine groups by means of epichlorohydrin which extends the polymer chain — providing an economical method of obtaining multiple reaction sites for additional epichlorohydrin cross-linking agent in a polymer unit.

In making polymer B, the amino carbonyl, reactant (b) and the amine, reactant (c), are the same reactants as used in preparation of polymer A, above.

Polymer C is described and claimed in co-pending application Ser. No. 156,127 filed June 23, 1971, now U.S. Pat. No. 3,761,350. This polymer is prepared by reacting:

a. a heterocyclic dicarboxylic acid, reactant (a) for polymer A, and for each mol of acid, A mol of water is added to this mixture, and the whole is cooled to a temperature of from about 80° to 90°C., and epichlorohydrin is then added slowly. After addition of all the epichorohydrin, the mixture is again heated to a temperature from about 165°C. to 215°C., the water of condensation being removed during heating. The epichlorohydrin reacts with available primary amine groups and, in so doing, links together the prepolymers to form the water-soluble polyamine polyamide polymer. In addition, the reaction between the epichlorohydrin and the primary amine groups produces secondary amine groups which are available for cross-linking by means of epichlorohydrin.

A storage-stable solution of the polyamine polyamide polymer C can be obtained by adding sufficient water to the polymer to provide a solution containing from about 35 to 75% solids.

The polymer contains the following repeating units:

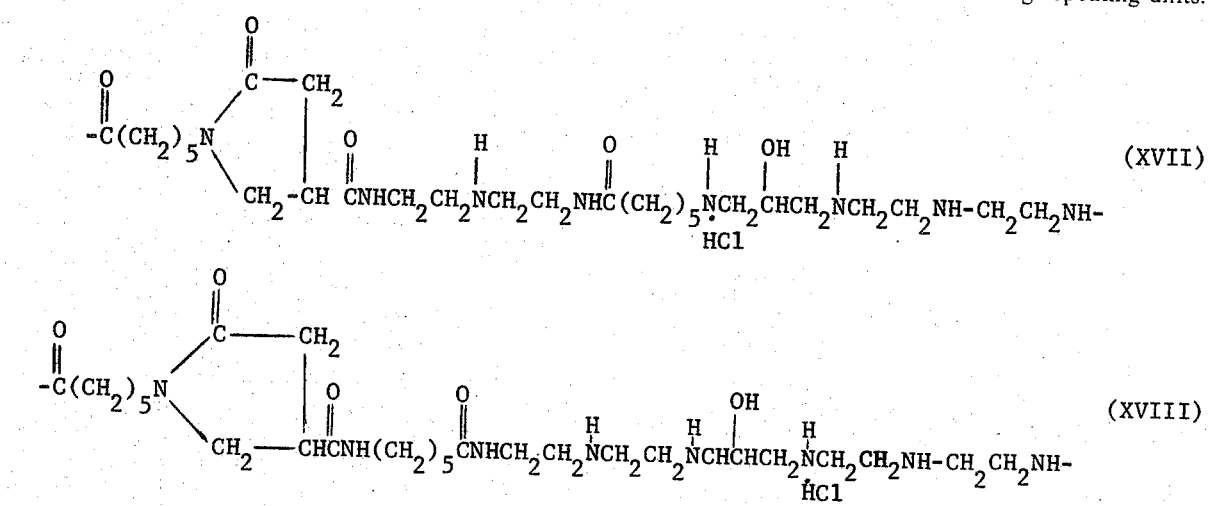

b. from 0–5 mols of amino carbonyl compound, reactant (b) for polymer A, and c. from 1–4 mols of diamine or polyalkylene polyamine, reactant (c) for polymer A, and e. from 1 to 3 mols of epichlorohydrin, to form a water soluble polyamine polyamide polymer.

As disclosed in co-pending application Ser. No. 156,127, now U.S. Pat. No. 3,761,350, a preferred process by which the water soluble polyamine polyamide polymer C may be prepared from the above-defined reactants comprises first mixing together in a suitable reactor the heterocyclic dicarboxylic acid, the amino carbonyl compound, if any, and the amine and heating the mixture at a temperature of from about 135°C. to about 165°C. under reflux conditions for a period of from about 30 to 60 minutes. During such heating, the components react to form low molecular weight prepolymers. A low molecular weight unit obtained when using 1carboxypentyl-4-carboxy pyrrolidone, caprolactam, and diethylenetriamine as the reactants is as follows:

Preferred mol ratios of the four reactants in obtaining resins of optimum wet strength (uncured and after cure) are for each mol of (a), one mol (b), two mols (c), to one mol (e).

In summary, the molar ratios of reactants for polymers A, B and C is as follows:

For polymer A, the mol ratio of reactants is:
(b) to (a) — 0:1 to 4:1
(c) to (a) — 1:1 to 3:1
(d) to (a) — 1:1 to 2:1 the preferred ratio being:
(b) to (a) — 1:1
(c) to (a) — 3:1
(d) to (a) — 2:1

For polymer B, the mol ratio of reactants is:
(c) to (b) — 1:5 to 4:1
(e) to (b) — 1:5 to 3:1
(e) to (c) — 1:4 to 3:1

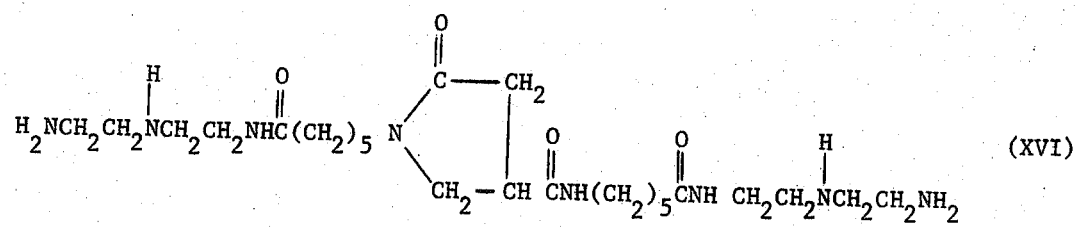

the preferred ratios being:
(c) to (b) — 1:1
(e) to (b) — 1:1
(e) to (c) — 1:1

For polymer C, the mol ratio of reactants is:
(b) to (a) — 0.1 to 5:1
(c) to (a) — 2:1 to 4:1
(e) to (a) — 1:1 to 3:1 the preferred ratios being:
(b) to (a) — 1:1
(c) to (a) — 2:1
(e) to (a) — 1:1

In the preparation of the finished resin composition of this invention, mixtures of A and B, A and c, or A, B and C may be utilized. In the case of mixtures of polymers A and B, their mol ratios may be:
B to A — 1:19 to 19:1 the preferred ratio being:
B to A — 1:1.7

Similarly, mixtures of polymers A and C may be utilized, and their mol ratios may be:
C to A — 1:19 to 19:1 the preferred ratio being:
C to A — 1:1

In the case of mixtures of polymers A, B and C, the combined amounts of polymers B and C should be the same as the amount of polymer B or C in the binary mixtures of A and B or A and C.

The mixtures of polymers at about 20% to 30% solids is treated with epichlorohydrin at 40°C. to 60°C., and the reaction is continued at about 70°C. to 76°C., until the pH of the system reaches about 6.9 to 7.2, or the Gardner Holdt viscosity is greater than J, whichever course is desired to follow. The system is then diluted with water to the desired solids content and acidified to pH 5 with acid. Generally, from about 0.5 to about 1.8 mols of epichlorohydrin per secondary amine group should be used in rendering the polymers thermosetting. The preferred amount of epichlorohydrin used for such purpose is about one mol for each secondary amine group on the polymers from the mixture.

The cationic thermosetting resins of this invention impart improved wet and dry strength to paper (uncured or cured) at reduced cost whether made under acid, alkaline, or neutral conditions and accelerated natural aging.

The resin preferably is incorporated into paper pulp at any point on the wet end of the paper machine, e.g., at the beater, stock chest, head box, etc. The resin may also be applied to a web of paper as by immersing the web in a solution of the resin, by spraying, etc., followed by heating to cure the resin. For most purposes, adequate wet strength is developed by simply drying the sheet and allowing natural aging to take place.

Adequate wet strength may be obtained by incorporating in the paper from about 0.15% to about 3% of the resin based on the dry weight of the pulp. Higher percentage additions may be made for special purposes.

Paper and pulp slurries having a pH of from 4.5 to 11 may be effectively treated with resins of this invention.

The invention is further illustrated by the following examples. In each of examples 1 to 11, inclusive, the heterocyclic dicarboxylic acid reactant (a) is formed in situ by reaction of reactants (b) and (d) in the initial steps. Since reactants (b) and (d) react in equimolar proportion to form reactant (a), the limiting reactant in the first step determines the quantity of reactant (a) that is formed. The excess reactant remains in the system and is available for further reaction.

EXAMPLE NO. 1

Polymer A

Into a one liter flask equipped with condenser, thermometer, and stirrer were charged 68.5 g. (0.5 mols) of p-aminobenzoic acid, 65 g. (0.5 mols) of itaconic acid, and 54 ml. of water. The mixture was refluxed for two hours. To this reaction intermediate were added 103 g. (1 mol) of diethylenetriamine. The whole was then refluxed at 132°C. for 1 hour. The reaction mixture was again cooled to 26°C. and 132 g. (1.01 mols) of itaconic acid were added, and the mixture heated to reflux for 1 hour at 125°C. At 117°C. were added 51.5 g. (0.5 mols) of diethylenetriamine. The whole was then heated to 180°–190°C. with vacuum applied for ¾ of an hour at this temperature. The finished polymer A was diluted to 50% solids content with water, and the Gardner-Holdt viscosity was G at 25°C.

The polyamine polyamide polymer A comprised one mol of p-aminobenzoic acid, three mols of itaconic acid, and three mols of amine. The amine equivalent based on secondary amine is 236.7.

Polymer B

Into a one liter flask equipped with a condenser, thermometer, and stirrer were charged 60 g. (1 mol) of ethylenediamine, 113 g. (1 mol) of caprolactam, and 13.3 ml. of water. This mixture was refluxed for 3 hours at 124°C. and then cooled to 29°C., adding 18 ml. of water. Immediately, 92.5 g. (1 mol) of epichlorohydrin were added incrementally, controlling the exotherm with cooling so as not to exceed 90°C. After all the epichlorohydrin was added, the whole was heated to 204°C., collecting 31.5 ml. of distillate. The reaction mixture was diluted to 50% solids with 233.8 ml of water plus the collected distillate. The Gardner-Holdt viscosity of the resulting polymer B (polyhydroxy polyamine polyamide) was I+ at 25°C.

Polymer B comprised one mol of amine, one mol of amino acid, and one mol of epichlorohydrin. Amine equivalent based on secondary amine — 132.8 (includes secondary amine hydrochloride).

Conversion to Cationic Thermosetting Resin

In a one liter flask were charged 74.34 g. (0.14 mols) of the above polymer B, 99.40 g. (0.7 mols) of the polymer A, and 148 ml. of water. This mixture was heated to 50°C. Then, 22.67 g. (0.245 mols) of epichlorohydrin were added dropwise over a period of 6 minutes, allowing the exotherm to 57°C. The mixture was held at 75°C. until the Gardner-Holdt viscosity was greater than J. The resin mixture was then diluted with 203.3 ml. of water to 20% solids and acidified to pH 5 (Accutint paper) with sulfuric acid. The Gardner-Holdt viscosity of the 20% solution was E at 25°C. The mol ratio of polymer B to polymer A was 1:0.5, and ratio of epichlorohydrin to amine equivalent 0.5:1.

EXAMPLE NO. 2

Polymer A

Into one liter flask were charged 226 g. (2.0 mols) of caprolactam, 130 g. (one mol) of itaconic acid, and 36 ml. of water. This mixture was reluxed for 2 hours. To this reaction intermediate were added 203 g. (1.97 mols) of diethylenetriamine, which was then refluxed at 143°C. for 1 hour. The reaction mixture was again cooled to 65°C., and 260 g. (2 mols) of itaconic acid were added at 82°C. Then, the mixture was heated to reflux for one hour at 131°C. At 115°C. were added 103 g. (1 mol) of diethylenetriamine. The whole was then heated to 177°C. with vacuum applied until the finished polymer A at 50% solids reached the Gardner-Holdt viscosity of U at 25°C.

The polypyrrolidone polyamine polyamide polymer A comprised two mols of caprolactam, three mols of itaconic acid, and three mols of diethylenetriamine. The amine equivalent based on secondary amine was 272.3.

Polymer B

A polyhydroxy polyamine polyamide polymer B was prepared from 51.5 g. (0.5 mols) of diethylenetriamine, 68.5 g. (0.5 mols) of p-aminobenzoic acid, 36 ml. of water and 46.2 g. (0.5 mols) of epichlorohydrin. The procedure of Example No. 1 for preparation of polymer B was essentially followed. The resulting polymer B solution contained 50% solids and had a viscosity of A on the Gardner-Holdt scale at 25°C.

This polyhydroxy polyamine polyamide polymer B comprised one mol of amine, one mol of aromatic amino acid, and one mol of epichlorohydrin. The amine equivalent based on secondary amine — 104.8 (includes secondary amine hydrochloride).

Conversion to Cationic Thermosetting Resin

Into a one liter flask were charged 18.87 g. (0.03 mols) of the above polymer B, 84.8 g. (0.052 mols) of the polymer A, and 103.3 g. of water. This mixture was heated to 53°C. at which temperature 22.73 g. (0.246 mols) of epichlorohydrin were added dropwise, allowing the reaction temperature to rise up to 56°C. The mixture was then held at 75°C. until the Gardner-Holdt viscosity was greater than J. The resulting thermosetting resin solution was immediately diluted with 215.2 ml. of water to 15% solids and acidified with sulfuric acid to Accutint pH 5.4. The Gardner-Holdt viscosity of the 15% solution was C at 25°C. The mol ratio of the polymer B to the polymer A was 1:1.73, and the ratio of epichlorohydrin to amine equivalent 1:1.

EXAMPLE NO. 3

Polymer B

A polyhydroxy polyamine polyamide polymer B was prepared from 155 g. (1.5 mols) diethylenetriamine, 170 g. (1.5 mols) of caprolactam, 27 ml. of water and 146 g. (1.58 mols) of epichlorohydrin according to the procedure of Example No. 1. The resulting polymer B contained 70% solids with the Gardner-Holdt viscosity of Z4 at 25°C.

This polymer B comprised one mol of diethylenetriamine, one mol of caprolactam, and one mol of epichlorohydrin. The amine equivalent based on secondary amine — 102.8 (includes secondary amine hydrochloride).

Conversion to Cationic Thermosetting Resin

Into one liter flask were charged 11.5 g. (0.027 mols) of the above polymer B, 72.2 g. (0.044 mols) of the polymer A prepared in Example No. 2, and 109.3 ml. of water. The mixture was heated to 51°C. before adding dropwise 29.22 g. (0.315 mols) of epichlorohydrin over a period of 5 minutes. The resulting resin solution was kept at 75°C. until the pH of the product reached 7.2 on an Accutint ph paper. The resin solution was immediately diluted with 275.8 ml. of water to 15% solids. Formic acid was used in acidifying the solution to Accutint pH 5.4. The Gardner-Holdt viscosity of the 15% solution was B at 25°C. The mol ratio of the polymer B to the polymer A was 1:1.7, and the ratio of epichlorohydrin to amine equivalent 1.5:1.

EXAMPLE NO. 4

Polymer A

A polypyrrolidone polyamine polyamide polymer A was prepared from 226 g. (2 mols) of caprolactam, 390 g. (3 mols) of itaconic acid, and 293.55 g. (2.85 mols) of diethylenetriamine, using the procedure of Example No. 2, except there was no pre-cooling of reaction intermediates at each successive chemical addition step. The polymer A at 65% solids had a Gardner-Holdt viscosity of Z6+ at 27°C.

The polypyrrolidone polyamine polyamide polymer A comprises two mols of caprolactam, 3 mols of itaconic acid, and 2.85 mols of diethylenetriamine. The amine equivalent based on secondary amine is 281.3.

Polymer B

Into a one liter flask were charged 113 g. (1 mol) of caprolactam, 18 ml. of water, and 103 g. (1 mol) of diethylenetriamine. The mixture was refluxed for 2 hours and then heated further to distill off the water added to 163°C. Upon cooling to about 80°C., the collected distillates were returned to the flask.

To a second one liter flask were transferred 7.02 (0.03 mols) of the above intermediate, and added 54 ml. of water and 2.78 g. (0.03 mols) epichlorohydrin at 34°C. The resulting polyhydroxy polyamine polyamide polymer B comprised one mol of amine, one mol of amino acid, and one mol of epichlorohydrin. The amine equivalent based on secondary amine — 102.8 (includes secondary amine hydrochloride).

Conversion to Cationic Thermosetting Resin

Into the above second flask containing the finished polymer B (0.03 mols) were charged 64 g. (0.052 mols) of the polymer A, and 82.2 ml. of water. This mixture was heated to 52°C. Then, 32.9 g. (0.356 mols) of epichlorohydrin were added slowly while the reaction mixture was maintained at 52°–61°C. Reaction continued at 75°C. until the reaction product reached the Gardner-Holdt viscosity greater than J. Immediately, 313.1 ml. of water were added to obtain a 15% solids solution and the solution acidified with sulfuric acid to Accutint pH 5.3. The Gardner-Holdt viscosity of the 15% solution was less than A at 25°C. The mol ratio of the polymer B to the polymer A was 1:1.73, and the ratio of epichlorohydrin to amine equivalent 1.5:1.

EXAMPLE NO. 5

Into a one liter flask were charged 84.96 g. (0.16 mols) of polymer B of Example 1 and 67.04 ml. of water. The resulting solution was heated to 55°C. before adding dropwise 29.6 g. (0.32 mols) of epichlorohydrin. The reaction mixture was held at 76°C. until the solution reached the Gardner-Holdt viscosity greater than J. To the above solution were added 253.9 ml. of water to product a 15% solids solution which was acidified with sulfuric acid to pH 5.4 using Accutint pH paper. The Gardner-Holdt viscosity of the 15% solution was B at 25°C.

EXAMPLE NO. 6

Into a one liter flask were charged 98.04 g. (0.06 mols) of the polymer A of Example No. 2 and 107 ml.

of water. This mixture was heated to 58°C., then 23.31 g. (0.25 mols) of epichlorohydrin were added dropwise over a period of 5 minutes. The reaction mixture was held at 76°C. until the solution reached the Gardner-Holdt viscosity greater than J. To the above solution were added 253.9 ml. of water to product a 15% solids solution which was acidified with sulfuric acid to pH 5.4 using Accutint pH paper. The Gardner-Holdt viscosity of the 15% solution was B at 25°C.

EXAMPLE NO. 7

Polymer A

A polypyrrolidone polyamine polyamide polymer A was prepared from 237.3 g. (2.1 mols) of caprolactam, 136.5 g. (1.05 mols) of itaconic acid, 72.1 g. (.7 mols) of diethylenetriamine, and 66.1 g. (0.35 mols) of tetraethylenepentamine according to the procedure of Example 2. This polymer A at 50% solids had a Gardner-Holdt viscosity of Z2 at 25°C.

The polymer A comprised six mols of caprolactam, 3 mols of itaconic acid, 2 mols of diethylenetriamine, and 1 mol of tetraethylenepentamine. The amine equivalent based on secondary amine is 225.8.

Polymer c

Into a one liter flask equipped with condenser, thermometer, and stirrer were charged 130 g. (1 mol) of itaconic acid, 300 g. of water, and 137 g. (1 mol) of p-aminobenzoic acid. The reaction mixture was heated to reflux and concentrated to one third the volume of water, and the solid heterocyclic dicarboxylic acid began to precipitate from solution. This acid has a melting point of 279°-288°C. and an acid number of 435 (theory 452).

The above mixture was cooled and 206 g. (2 mols) of diethylenetriamine and 113 g. (1 mol) of caprolactam were added. The temperature was held below 105°C. during the addition. After solution of the materials, the reaction mixture was further cooled to 40°C. and 92.5 g. (1 mol) of epichlorohydrin were added incrementally controlling the exotherm to 110°C. with cooling. After the epichlorohydrin was added, the mixture was heated to 190°-195°c. for one-half hour. The polymer C was diluted to 50% polymer solids with 570 g. of water. The Gardner-Holdt viscosity of this solution was E at 25°C.

The polypyrrolidone polyhydroxy polyamine polyamide polymer C comprised 1 mol of heterocyclic dicarboxylic acid, 1 mol of amino acid, 2 mols of amine, and 1 mol of epichlorohydrin. Amine equivalent based on secondary amine — 156.2 (includes secondary amine hydrochloride).

Conversion to Cationic Thermosetting Resin:

A 15% solids resin solution was prepared from 34.98 g. (0.028 mol) of the above polymer c, 63.2 g. (0.028 mol) of the polymer A, 25.65 g. (0.277 mol) of epichlorohydrin, and 374.45 ml. of water, following essentially the procedure used for Example 3, except phosphoric acid was used for the final acidification. The Gardner-Holdt viscosity of the 15% solution was A+ at 25°C. The mol ratio of the polymer C to the polymer A was 1:1, and the ratio of epichlorohydrin to amine equivalent 1.1:1.

EXAMPLE NO. 8

Polymer C

A polypyrrolidone polyhydroxy polyamine polyamide polymer C was prepared from 91 g. (0.7 mols) of 6-aminohexanoic acid, 12.5 g. of water, 90.5 g. (0.7 mols) of itaconic acid, 143 g. (139 mols) of diethylenetriamine, and 64.3 g. (0.7 mols) of epichlorohydrin according to the procedure of Example No. 7. This polymer C at 50% solids had a Gardner-Holdt viscosity of Q+ at 25°C.

The polymer C comprised one mol of itaconic acid, one mol of 6-aminohexanoic acid, one mol of epichlorohydrin, and two mols of diethylenetriamine. The amine equivalent based on secondary amine — 135.4 (includes secondary amine hydrochloride).

Conversion to Cationic Thermosetting Resin:

Into a 1 liter flask were charged 29.24 g. (0.027 mols) of the above polymer C, 83.3 g. (0.0675 mols) of the polymer A of Example No. 4, and 196.3 ml. of water. The mixture was heated to 50°C. before adding dropwise 55.54 g. (0.6 mols) of epichlorohydrin over a period of six minutes. Reaction was first held at 60°c. for 2 hours and then continued to 86°C. until the Gardner-Holdt viscosity was greater than H. Immediately 142.7 ml. of water were added to obtain a 25% solids solution which were acidified to Accutint pH 4.8 with sulfuric acid. The Gardner-Holdt viscosity of the 25% solution was C at 25°C. The mol ratio of the polymer C to the polymer A was 1:2.5, and the ratio of epichlorohydrin to amine equivalent 2:1.

EXAMPLE NO. 9

Polymer C

A polypyrrolidone polyhydroxy polyamine polyamide polymer C was prepared from 190 g. (1.46 mols) of itaconic acid, 330 g. (2.92 mols) of caprolactam, 30 g. of water, 300 g. (2.91 mols) of diethylenetriamine, and 135 g. (1.46 mols) of epichlorohydrin, essentially following the procedure of Example No. 7. This polymer C at 50% solids has a Gardner-Holdt viscosity of U at 25°C.

The polymer C comprised 1 mol of itaconic acid, 2 mols of amino acid, 2 mols of amine, and 1 mol of epichlorohydrin. The amine equivalent based on secondary amine — 154.6 (includes secondary amine hydrochloride).

Conversion to Cationic Thermosetting Resin:

Following the procedure of Example No. 3, a 15% solids resin solution was prepared from 47 g. (0.038 mols) of the above polymer C, 60.08 g. (0.0367 mols) of the polymer A made according to Example No. 2. The Gardner-Holdt viscosity of the 15% solution was D+ at 25°C. The mol ratio of the polymer C to the polymer A was 1.03:1, and the ratio of epichlorohydrin to amine equivalent 0.8:1.

EXAMPLE NO. 10

Polymer A

A polypyrrolidone polyamine polyamide polymer A was prepared from 195 g. (1.5 mols) of itaconic acid, 56.5 g. (0.5 mols) of caprolactam, 9 ml. of water 103 g. (1 mol) of diethylenetriamine, and 37 g. (0.5 mols) of 1,3-diaminopropane according to the procedure of Example No. 2. The polymer A at 50% solids had a Gardner-Holdt viscosity of G at 25°C.

The polymer A comprised 3 mols of itaconic acid, 1 mol of amino acid, and 3 mols of amine. The amine equivalent based on secondary amine is 337.5.

Polymer c.

A polypyrrolidone polyhydroxy polyamine polyamide polymer C was prepared from 113 g. (1 mol) of caprolactam, 120 g. (2 mols) of ethylenediamine, 130 g (1 mol) of itaconic acid, and 92.5 g. (1 mol) of epichlorohydrin using the procedure of Example No. 7. This polymer C at 50% solids had a viscosity of N on the Gardner-Holdt scale at 25°C. The polymer C comprised 1 mol of itaconic acid, 1 mol of caprolactam, 2 mols of ethylenediamine, and 1 mol of epichlorohydrin. The amine equivalent based on secondary amine — 209.8 (includes secondary amine hydrochloride).

Conversion of Cationic Thermosetting Resin:

A 25% solids solution was prepared from 20.4 g. (0.024 mols) of the above polymer C, 162 g. (0.12 mols) of the polymer A, 31.97 g. (0.346 mols) of epichlorohydrin. and 278 ml. of water, following the procedure of Example No. 8. The viscosity of the 25% solution was D+ at 25°C. on the Gardner-Holdt scale. The mol ratio of the polymer C to the polymer A was 1:5 and the ratio of epichlorohydrin to amine equivalent 1.2:1.

Preparation of Paper Samples

A bleached sulfite was beaten in a Valley beater. The pulp was adjusted to a pH value of 6.8 and 0.75% by weight, based on weight of dry pulp, of the resins described in the above examples, were applied to the stock. 43 lb. per ream (TAPPI Standard) sheets were made on the Noble and Wood handsheet machine without a closed white water system. The handsheets were dried 3 minutes at 105°C., and portions of them were later cured for 1 hour at 105°C.

TABLE I

Wet Tensile Strength (oz./in.)

| Example No. | | Off Machine | Cured |
|---|---|---|---|
| Blank (no resin) | | 16.1 | 22.9 |
| 1 Polymers | A + B | 48.8 | 91.6 |
| 2 do. | do. | 73.9 | 118.4 |
| 3 do. | do. | 87.1 | 149.1 |
| 4 do. | do. | 84.7 | 147.5 |
| 5 Polymer | B | 48.8 | 101.2 |
| 6 Polymer | A | 89.0 | 144.4 |
| 7 Polymers | A + C | 54.4 | 102.7 |
| 8 do. | do. | 86.7 | 136.7 |
| 9 do. | do. | 51.9 | 101.6 |
| 10 do. | do. | 60.7 | 109.1 |

Set forth in Table II are the dry tensile strengths provided by the cationic thermosetting resins of the several examples when applied to bleached sulfite pulp paper as described above.

TABLE II

Dry Tensile Strength (oz./in.)

| Example No. | | Off Machine | Cured |
|---|---|---|---|
| Blank (no resin) | | 420.3 | 411.7 |
| 1 Polymers | A + B | 449.2 | 445.5 |
| 2 do. | do. | 442.4 | 480.6 |
| 3 do. | do. | 452.9 | 460.3 |
| 4 do. | do. | — | 472.3 |
| 5 Polymer | B | 422.4 | 421.3 |
| 6 Polymer | A | 458.9 | 463.3 |
| 7 Polymers | A + C | 399.2 | 417.9 |
| 8 do. | do. | 439.7 | 462.2 |
| 9 do. | do. | 376.9 | 426.1 |
| 10 do. | do. | 412.0 | 427.4 |

Commercially preferred resin compositions of this invention are evaluated separately in TAble III.

Preparation of Paper Samples

An 80% softwood and 20% hardwood bleached sulfite was beaten in a Valley beater. The pulp was adjusted to a pH value of 7.0 and the resins described in Example Nos. 3, 4 and 8 were applied to the stock at the rate of 0.75%, based on the dry weight of pulp. 43 lb. per ream (TAPPI Standard) sheets were made on the Noble and Wood handsheet machine without a closed white water system. The handsheets were dried 3 minutes at 105°C., and portions of them were later cured for 1 hour at 105°C.

TABLE III

| Example | Wet Tensile (oz./in.) | | Dry Tensile (oz./in.) | |
|---|---|---|---|---|
| No. | Off Machine | Cured | Off Machine | Cured |
| Blank | 12.9 | 21.8 | 381.6 | 401.1 |
| 3 A + B | 86.0 | 159.4 | 463.7 | 475.0 |
| 4 do. | 86.0 | 161.6 | 487.9 | 489.7 |
| 8 A + C | 82.1 | 153.0 | 450.6 | 453.3 |

The data set forth in Tables I–III show that the resin compositions comprising a mixture of polymers A and B, or A and C provide wet and dry strengths equal to those provided by the more expensive resin comprising polymer B above. Thus, by proper blending of polymers, adequate wet and dry strengths may be obtained at reduced prices.

EXAMPLE NO. 11

This example shows further advantages of resin compositions of this invention when applied to paper in various amounts and over a range of pH values.

Polymer A

Into a 2 liter flask equipped with condenser, thermometer, and stirrer were charged 36 g. water, 226 g. caprolactam, and 130 g. of itaconic acid. This mixutre was heated at 105°C. for 1 hour and then heated to reflux for 3 hours. The reaction intermediate was cooled, 206 g. of diethylenetriamine were added, and the resulting mixture was then refluxed for 1 hour. The reaction mixture was again cooled and 273 g. of itaconic acid were added, and the mixture held at 105°C. for 1 hour and then heated to reflux. Cooling was again applied, and 108 g. diethylenetriamine were added. The reaction mixture was then heated to 188°C. with vacuum applied for one-half hour at this temperature. The resin diluted to 50% solids content, and the Gardner-Holdt viscosity of the diluted solution was U at 25°C. The amine equivalent of the polymer based on secondary amine is 272.3.

The polymer A comprised one mol heterocyclic dicarboxylic acid, 1 mol amino carbonyl, 1.5 mols amine and about 2 mols of epichlorohydrin.

78 g. of the above product were diluted with 116 ml. of water and heated to 50°C. 16.5 g. of epichlorohydrin were added dropwise, and the reaction was held at 70°C. until the Gardner-Holdt viscosity was greater than I. The solution was then diluted with 343.5 ml. of water to 10% solids and acidified to pH 5 with sulfuric acid. The ratio of epichlorohydrin to secondary amine was 1.25 to 1. This 10% resin solution was used for comparative tests.

Polymer B

A polyhydroxy polyamine polyamide polymer B was prepared from 113 g. of caprolactam, 18 g. of water, 103 g. of diethylenetriamine, and 101.75 g. of epichlorohydrin in the following manner. Caprolactam, water, and diethylenetriamine were refluxed for 3 hours at 148°C., cooled to 40°C. when epichlorohydrin was added incrementally with cooling. After all the epichlorohydrin was added, the whole was heated to 185°C., ½ hour being under vacuum. The reaction mixture was diluted to 50% solids with 308.5 g. of water. The Gardner-Holdt viscosity of the diluted solution was W. The secondary amine equivalent was 102.8.

The polymer B comprised 1 mol of caprolactam, 1 mol of amine, and one mol of epichlorohydrin.

52 g. of the above polymer B were charged to a 1 liter flask and diluted with 81 ml. of water. This solution was heated to 50°C., and 24 g. of epichlorohydrin were added dropwise over a 15 minute period. The reaction was continued at 70°C. until the pH of the solution reached 6.9. At this point, 343 ml. of water were added and the pH adjusted to 5.1 with sulfuric acid. The product contained 10% resin solids, and the ratio of epichlorohydrin to secondary amine groups was 1.03 to 1.0. The 10% product was used for comparative tests.

Cationic Thermosetting Resin (Polymers A + B)

A polymer mixture was obtained by combining 30 g. of polymer B with 81.7 g. of polymer A. 76.8 g. of the above polymer solution were diluted with 149.2 ml. of water and heated to 51°C. 23.5 g. of epichlorohydrin were added dropwise over 6 minutes. The reaction was continued at 72 to 75°C. until a Gardner-Holdt viscosity greater than J was obtained. Dilution with 369.5 mls. of water gave a 10% solution which was acidified to pH 5 with sulfuric acid. The Gardner-Holdt viscosity of the finished product was A-B at 25°C. The ratio of epichlorohydrin to secondary amine was 1.27 to 1.

Preparation of Paper Samples

An 80% softwood and 20% hardwood beleached sulfite was beaten to a Canadian Freeness Value of 450 cc in a Valley beater. The pulp was adjusted to a pH value of 6.8 with sodium carbonate and variable amounts of the 10% resins described as A, B, and A+B were applied to the stock (0 to 1%) based on the dry weight of pulp. 43 lb. per ream (TAPPI Standard) sheets were made on the Noble and Wood handsheet machine without a closed white water system. The handsheets were dried 3 minutes at 105°C., and portions of them were later cured for 1 hour at 105°C.

TABLE IV

| | Wet Strength (oz./in.) | | | | | |
|---|---|---|---|---|---|---|
| | Polymer A | | Polymer B | | Polymers A+B | |
| wt% Resin | Dried | Cured | Dried | Cured | Dried | Cured |
| 0.0 | 16.3 | 16.4 | 16.3 | 16.4 | 16.3 | 16.4 |
| 0.2 | 31.3 | 48.3 | 25.5 | 42.2 | 34.0 | 54.1 |
| 0.5 | 53.2 | 79.4 | 36.4 | 66.3 | 53.5 | 90.5 |
| 1.0 | 66.7 | 108.7 | 45.8 | 81.0 | 73.9 | 110.8 |

| | Dry Strength (oz./in.) | | | | | |
|---|---|---|---|---|---|---|
| | Polymer A | | Polymer B | | Polymers A+B | |
| wt% Resin | Dried | Cured | Dried | Cured | Dried | Cured |
| 0.0 | 359 | 378 | 359 | 378 | 359 | 378 |
| 0.2 | 385 | 414 | 394 | 394 | 395 | 410 |
| 0.5 | 407 | 423 | 409 | 420 | 410 | 420 |
| 1.0 | 395 | 435 | 399 | 417 | 415 | 423 |

Table IV shows the increase in wet strength for the resin composition comprising a mixture of polymers A and B over either resin alone, at concentrations of resin equal to or less than 1%. The dry strengths show an improvement over the blank.

As stated above, polymer B is cheaper than polymer A, but provides poorer wet strength. Therefore, the combination of A and B gives unexpectedly greater strength at a lower price.

TABLE V

Effect of pH
Example No. 11

Resin Composition Comprising a Mixture of Polymers A and B

| | Wet Strength (oz./in.) | | Dry Strength (oz./in.) | |
|---|---|---|---|---|
| pH | Dried | Cured | Dried | Cured |
| 3.0 | 61.0 | 81.0 | 389 | 398 |
| 5.0 | 61.0 | 84.1 | 389 | 413 |
| 7.3 | 68.0 | 94.1 | 392 | 440 |
| 9.0 | 77.2 | 100.3 | 400 | 447 |

Table V shows the good wet and dry strength of a resin composition of this invention (Polymers A + B) over a broad range of pH, fulfilling one of the stated objects of this invention.

What is claimed is:

1. A cationic thermosetting resin composition comprising a mixture of a first polyamine polyamide polymer A, and for each mol of polymer A, from about 0.5 to about 14.4 mols of a second polyamine polyamide polymer B or C or a mixture thereof, said polymer A having been prepared by heating at a temperature of from about 150° to about 165°C. a mixture of:

a. a heterocyclic dicarboxylic acid of the formula:

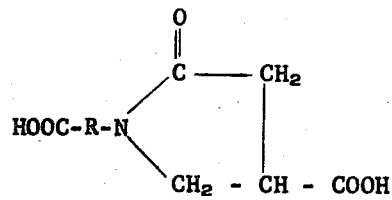

where R is an alkylene radical containing from 1 to 10 carbon atoms or an arylene radical, and for each mol of dicarboxylic acid;

b. an amino carbonyl compound which is an amino acid of the formula H$_2$N-R'-COOH or a lactam of the formula:

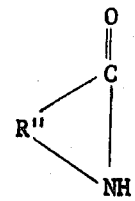

where R' is an alkylene radical containing from 1 to 10 carbon atoms or an arylene radical, and R" is an alkylene radical containing from 3 to 10 carbon atoms;

c. a portion of the total amount of an amine which is a diamine of the formula H$_2$N-R'''-NH$_2$ or a polyalkylenepolyamine of the formula H$_2$N-(R$^{iv}$-NH-)$_n$-H where R''' and R$^{iv}$ are alkylene groups containing from 2 to 6 carbon atoms, and n is an integer from 1 to 5; cooling the resulting first intermediate reaction product VIII, combining d. itaconic acid with said first intermediate reaction product in an amount so as to provide an excess of itaconic acid with respect to carbonyl groups to amine groups of said first intermediate and heating the mixture to a temperature of from about 110° to about 140°C. under reflux to obtain a second intermediate reaction product X, adding a further quantity of reactant (c) to said second intermediate reaction product and effecting condensation and removal of water by heating the mixture to a temperature of about 185°C., to form a water-soluble polyamide polyamine polymer XI, the proportions of reactants employed being from 0 to 4 mols of reactant (b), 1 to 3 mols of reactant (c) and 1 to 2 mols of reactant (d) for each mol of reactant (a), said polymer B having been prepared by heating together at reflux at about 105°C a mixture of from 1 to 5 mols of reactant (b) and from 1 to 4 mols of (c) to obtain intermediate polymer XIII, cooling said reaction mixture and adding thereto incrementally from 1 to 3 mols of epichlorohydrin to form intermediate XIV, heating the reaction product to a temperature of from 160° to 185°C. to obtain polymer XV;

said polymer C having been prepared by heating together at a temperature of from about 135° to about 165°C. under reflux conditions a mixture of reactant (a), and for each mol of reactant (a), from 0 to 5 mols of reactant (b) and from 1 to 3 mols of reactant (c), adding water to said reaction mixture and cooling said mixture to a temperature of from about 80° to about 90°C., adding slowly to said reaction mixture from 1 to 3 mols of epichlorohydrin and heating the resulting mixture to a temperature from about 165° to about 215°C. to remove water of condensation to obtain a polymer containing the repeating units XVII and XVIII adding to said mixture of polymers from about 0.5 to about 1.8 mols of epichlorohydrin per secondary amine group in said polymers and heating the resulting mixture at a temperature of from about 70° to about 76°C. until a Gardner-Holdt viscosity greater than J is obtained.

2. A cationic thermosetting resin composition according to claim 1 comprising a mixture of polymers A and B in the molar ratio of about 1.7 to 1.

3. A cationic thermosetting resin composition according to claim 2 in which 1 mol of reactant (b), 3 mols of reactant (c) and two mols of reactant (d) for each mol of reactant (a) are used in preparing polymer A, and one mol of each of reactants (b), (c) and (e) are used in preparing polymer B, and sufficient epichlorohydrin is reacted with said polymers to convert all of the secondary amino groups thereof to tertiary amino groups.

4. A cationic thermosetting resin composition according to claim 1 comprising a mixture of polymers A and C in the molar ratio of 1:1.

5. A cationic thermosetting resin according to claim 4 in which 1 mol of reactant (b), 3 mols of reactant (c) and two mols of reactant (d) for each mol of reactant (a) are used in preparing polymer A; and 1 mol of reactant (b), 2 mols of reactant (c) and 1 mol of reactant (e) for each mol of reactant (a) are used in preparing polymer C, and sufficient additional epichlorohydrin is reacted with said polymers to convert all of the secondary amino groups thereof to tertiary amino groups.

6. A cationic thermosetting resin composition according to claim 5 wherein in forming each of said polymers A and C, reactant (a) is 1-carboxypentyl-4-carboxypyrrolidone formed by reacting itaconic acid with caprolactam; reactant (b) is caprolactam, and reactant (c) is diethylene triamine.

7. An improved wet strength paper comprising a web of paper-making fibers and from about 0.15% to 3.0%, based on the weight of dry fibers, of the thermosetting resin composition of claim 1.

8. An improved wet strength paper comprising a web of paper-making fibers and from about 0.15% to 3.0%, based on weight of dry fibers, of the thermosetting resin composition of claim 2.

9. An improved wet strength paper comprising a web of paper-making fibers and from about 0.15% to about 3.0%, based on weight of dry fibers, of the thermosetting resin composition of claim 4.

10. An improved wet strength paper comprising a web of paper-making fibers and from about 0.15% to about 3.0%, based on weight of dry fibers, of the thermosetting resin composition of claim 6.

* * * * *

UNITED STATES PATENT OFFICE
CERTIFICATE OF CORRECTION

Patent No. 3,869,342      Dated March 4, 1975

Inventor(s) Francis S. Munjat and Samuel Ho Kim

It is certified that error appears in the above-identified patent and that said Letters Patent are hereby corrected as shown below:

In the Specification

Column 2, delete lines 34-38 inclusive.

Signed and Sealed this twenty-ninth Day of July 1975

[SEAL]

Attest:

RUTH C. MASON
*Attesting Officer*

C. MARSHALL DANN
*Commissioner of Patents and Trademarks*